Jan. 2, 1934.   O. WITTEL   1,942,231
AUTOMATIC REVERSING MECHANISM FOR MOTION PICTURE APPARATUS
Filed March 20, 1931   2 Sheets-Sheet 1
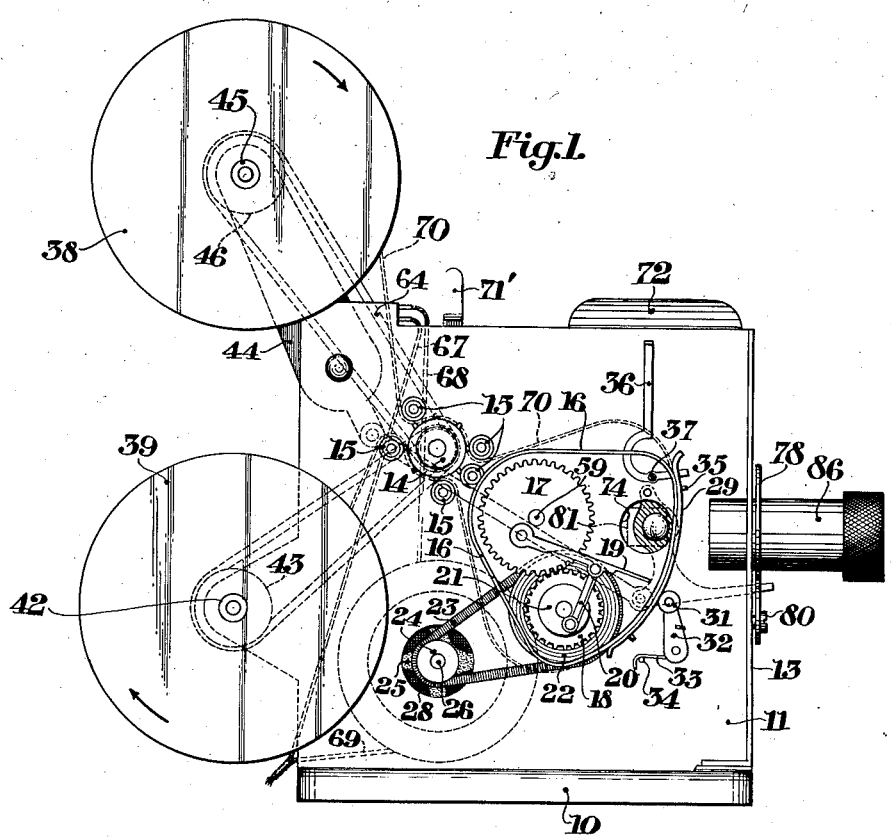
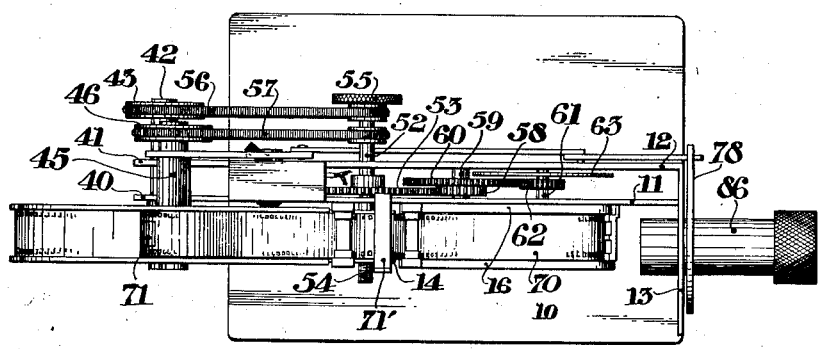

Jan. 2, 1934.  O. WITTEL  1,942,231
AUTOMATIC REVERSING MECHANISM FOR MOTION PICTURE APPARATUS
Filed March 20, 1931  2 Sheets-Sheet 2

Otto Wittel,
Inventor,

By Newton M Perrine
George A. Gillette, Jr.
Attorney

Patented Jan. 2, 1934

1,942,231

UNITED STATES PATENT OFFICE 1,942,231

AUTOMATIC REVERSING MECHANISM FOR MOTION PICTURE APPARATUS

Otto Wittel, Rochester, N. Y., assignor to Eastman Kodak Company, Rochester, N. Y., a corporation of New York Application March 20, 1931. Serial No. 524,051

15 Claims. (Cl. 88—16)

The present invention relates to improvements in automatic reversing mechanism for motion picture apparatus and more particularly to motion picture apparatus employing film with two rows of laterally adjacent images or exposure areas, progressive in opposite directions.

Existing motion picture apparatus, which are adapted to use film with laterally adjacent exposure areas or images, have the end of the film attached to the supply reel but utilize the tension on the film to move a roller contacting the surface of the film or provide an aperture in the film to actuate a trigger, in either case the objective is automatically shifted and the film advancing mechanism is reversed.

The primary object of the present invention is to provide a motion picture apparatus employing film with laterally adjacent rows of images or exposure areas in which the supply means is moved directly by the tension in the film to automatically shift the objective and reverse the film advancing mechanism.

Another object of the invention is the provision of a motion picture apparatus for film with laterally adjacent rows of areas for projection or exposure in which the film advancing mechanism is reversed by reversing the direction of rotation of the prime mover.

A further object of the invention is the combination with a motion picture apparatus for film with laterally adjacent rows of exposure areas or images, of a gate member with displaced apertures being automatically moved to proper position by reversal of the direction of film movement.

A still further object of the invention is the combination with a motion picture apparatus for film with laterally adjacent rows of object or image frames, of a shiftable optical system in which not only the objective means but also the condenser means is automatically moved upon the completion of the initial run of the film.

Still another object of my invention is the provision of simplified, comparatively inexpensive motion picture apparatus for film with two rows of images but which is fully automatic during the entire run of the film.

Other and further objects of the invention will occur to those skilled in the art as the following description proceeds.

The above mentioned objects of the invention are embodied in a motion picture machine having a shiftable optical system operated by a movable reel supporting means which simultaneously actuates a reversing means for the prime mover. The gate may have a presser pad provided with displaced apertures which is automatically positioned according to the direction of film movement.

While the following description of the invention is referred to a motion picture projector, it should be noted that adaption of the invention to other types of motion picture apparatus is within the scope of the invention.

Reference is now made to the accompanying drawings wherein like reference numerals designate like parts and wherein:

Fig. 1 is a side elevation of the motion picture projector showing the film advancing mechanism.

Fig. 3 is a top view of the projector embodying the invention, and

Figure 2:
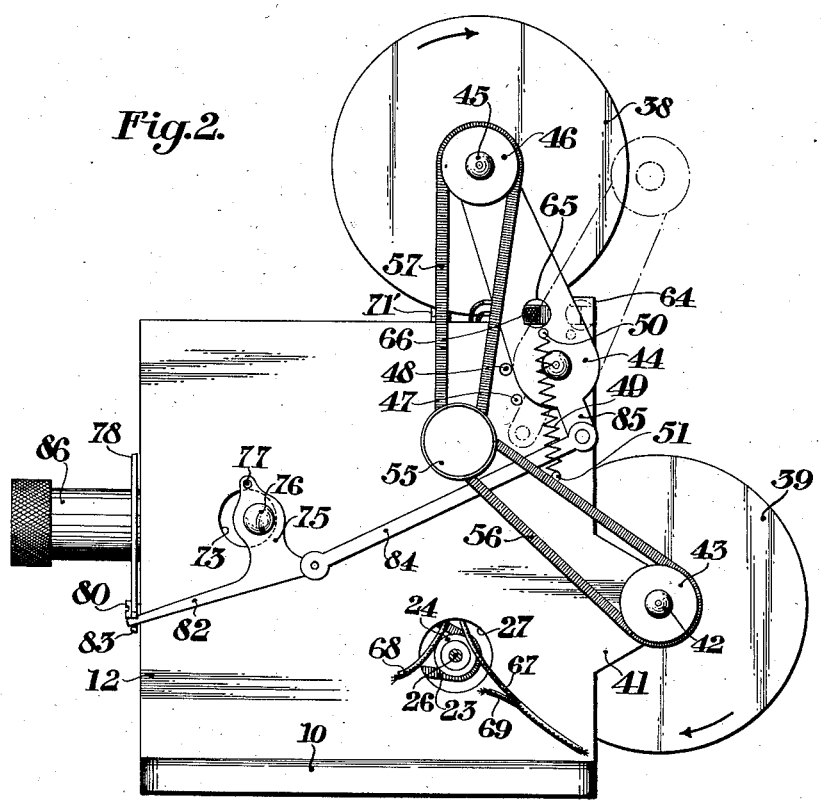
Fig. 2 is an elevation of the motion picture projector from the side opposite that shown in Fig. 1 with the lamp house and prime mover removed.
Figure 4:
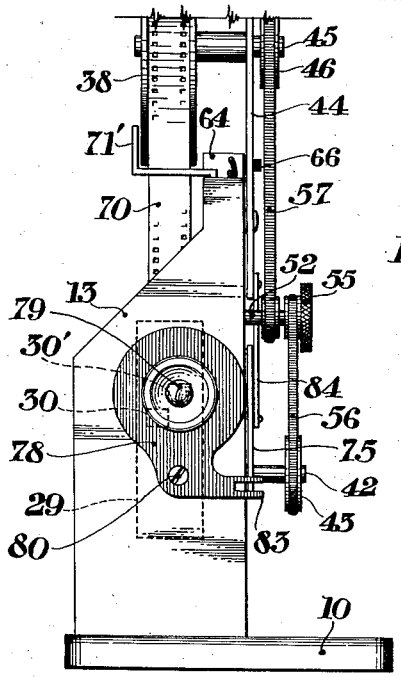
Fig. 4 is a front elevation of Fig. 2.

In the illustrated embodiment of the invention the base 10 supports two vertical partitions 11 and 12 which extend longitudinally of base 10 and are transversely spaced thereon. A front plate 13 is attached to base 10 and to partitions 11 and 12.

The film advancing mechanism may be of any known type such as a feeding sprocket 14 having a plurality of idle rollers 15 rotatably mounted on partition 11 near said feeding sprocket 14 and a channeled guideway 16 encircling a pulldown mechanism of the claw type. The pulldown mechanism comprises two inter-engaging gears 17 and 18, a claw arm 19 eccentrically mounted on gear 17 and a connecting link 20 intermediately hinged at one end to claw arm 19 and eccentrically pivoted at the other end to a drum 21 attached concentrically to gear 18. A pulley 22 is mounted to turn concentrically with gear 18 and is driven by a spring belt 23 which is in turn driven by the pulley 24 of a prime mover such as electric motor 25. The motor 25 is mounted on base 10 with its shaft 26 extending through the hole 27 in partition 12, and hole 28 in partition 11 so that pulley 24 is in line with pulley 22 of the pulldown.

The gate may be of known construction with laterally adjacent apertures or may preferably comprise an arcuate channeled presser pad 29 provided with displaced apertures 30 and 30' and which is movably held in frictional engagement with the film, to move therewith, by a roller 31 on the free end of a pivoted arm 32. A coil spring 33 acts between a stud 34 and arm 32 to maintain roller 31 in rolling engagement with presser pad 29. Pins 35 on guideway 16 engage slots in presser pad 29 to limit the movement thereof with the film and a framing arm 36 pivots about a bolt 37 and also engages a slot in presser pad 29 to permit framing of the images on the film within either of the displaced apertures 30 or 30' of the presser pad 29. The preferred gate construction and framing means is similar to that disclosed in my co-pending application for Improvements in gate construction for motion picture machines filed February 19, 1931, Serial No. 516,849.

The spooling means for the film consists of reels 38 and 39, reel 38 functioning as supply reel and reel 39 as the take-up reel during the initial run of the film through the apparatus, and reel 39 acting as supply reel and reel 38 as take-up reel during the reverse run of the film through the apparatus.

Supporting ears 40 and 41 are integral with the rear edges of partitions 11 and 12, respectively, and rotatably support reel shaft 42. The end of reel shaft 42 which projects beyond supporting ear 40 is of the known square-round formation while the end of reel shaft 42 which projects beyond supporting ear 41 has a one-way clutch 43 also of known construction and adapted to positively rotate reel 39 in the direction of the arrow in Fig. 1.

A movable reel supporting means may comprise a support arm 44 pivotally mounted on partition 12 and rotatably supporting a reel shaft 45 which has a one-way clutch 46 on one end thereof and which extends above and over partitions 11 and 12. The end of shaft 45 extending beyond partition 11 is of the known square-round construction and supports reel 38 in line with reel 39, feeding sprocket 14 and guideway 16. One-way clutch 46 is operated in a direction opposite to that in which clutch 43 is operative, or in the direction of the arrow in Fig. 2, and allows free rotation of reel 38 in the direction of the arrow in Fig. 1.

The support arm 44 is adapted to assume two distinct positions, a rearward position shown in Fig. 1 and indicated in dotted lines in Fig. 2, and a forward position shown in full lines in Fig. 2. Stops 47 and 48 are located on partition 12 so that stop 47 abuts support arm 44 in rearward position and so that stop 48 abuts support arm 44 in forward position. An off-center spring 49 is under tension between stud 50 on support arm 44 and stud 51 on partition 12 so that support arm 44 is positively held against stop 47 or stop 48 in rearward or forward position, respectively.

A shaft 52 is rotatably mounted in partitions 11 and 12 and has a gear 53 mounted thereon between the partitions 11 and 12. Feeding sprocket 14 is mounted on shaft 52 which has a threaded extension 54 for the attachment of a crank handle (not shown) if the machine is to be manually driven. A knurled knob 55 is attached to the other end of shaft 52, the hub of knob 55 being provided with two belt grooves, preferably but not necessarily in line with grooves provided on the peripheries of respective one-way clutches 43 and 46. A spring belt 56 encircles one groove in the hub knob 55 and clutch 43 while a spring belt 57 encircles the other groove in the hub of knob 55 and clutch 46.

Gear 53, see Fig. 3, engages a gear 58 on a shaft 59 which also carries a larger gear 60 and the gear 17 of the pulldown mechanism. A shaft 61 carries a gear 62 meshing with gear 60 and a shutter 63 of known construction between partitions 11 and 12.

A reversing means such as a reversing switch 64 is mounted so as to be operated by the support arm 44. In the illustrated embodiment the switch 64 is mounted on top of partitions 11 and 12 so that the handle 66 of switch 64 protrudes through a hole 65 in support arm 44. One leg of switch 64 is connected to one terminal of a source of electrical energy by a wire 67 preferably insulated and extending down between partitions 11 and 12. The other leg of switch 64 is connected to one side of the motor 25 by means of a wire 68 also extending down between partitions 11 and 12 and out through hole 27 in partition 12. The other side of motor 25 is connected to the other terminal of the source of electrical energy by a wire 69.

The path of the film 70 through the apparatus is best illustrated by Fig. 1 and extends from reel 38, freely rotating in the direction of the arrow in Fig. 1, around feeding sprocket 14, in a loop around guideway 16 and through the gate, around feeding sprocket 14 to reel 39, now positively driven in the direction of the arrow in Fig. 1 by one-way clutch 43. Since the film 70 contains two lateral rows of images or exposure areas, each image or exposure area will be one-half the height of the ordinary frame. Hence, four images or exposure areas will now occupy the area of an ordinary frame and subject matter previously requiring four hundred feet of film will only require one hundred feet of film. Reels 38 and 39 need, therefore, be only one hundred foot reels.

The rear end of film 70 is attached to the hub of reel 38 in any convenient manner such as by a circular spring clamp 71 so that at the end of the initial run, the film 70 between reel 38 and feeding sprocket 14 is placed under sufficiently increased tension acting directly on the reel 38 and pulling the same forward to a position where off-center spring 49 is effective to move support arm 44 into abutting relation to stop 48.

The forward movement of the support arm 44 also moves the handle 66 of reversing switch 64 from forward running position to reverse running position and motor 25 together with the film advancing mechanism is reversed. Reel 39 being freely rotatable in the direction of the arrow in Fig. 2, functions as the supply reel, and reel 38 being positively driven through one-way clutch 46 in the direction of the arrow in Fig. 2, functions as the take-up reel. The presser pad 29 is moved by frictional engagement with the film 70 so that the other row of images will pass before the corresponding aperture 30 in the gate.

The action of off-center spring 49 to cause the latter part of the movement of support arm 44 provides sufficient slack in the film 70 between reel 38 and feeding sprocket 14 to compensate for the continued forward motion of the film advancing mechanism due to inertia of parts, backlash in the gears or slip between the pulleys and spring belts after motor 25 has been reversed.

A guard such as a bent arm 71' may be attached to partition 11 and is so located along the upper edge thereof that reel 38 cannot be removed from the square-round portion of shaft 42 during the forward position of support arm 44 although said reel and shaft are free to rotate.

A suitable light source is placed within lamp housing 72 and is adapted to direct beams of light through the hole 73 in partition 12 and hole 74 in partition 11. The blades of shutter 63 pass between holes 73 and 74 and are properly synchronized with the pulldown mechanism in a known manner.

The utilization of the known type of stationary optical systems would require lenses of comparatively great diameters and extraordinary optical characteristics, hence a shiftable optical system is used. Furthermore, it is preferred to use a shiftable optical system in which the condenser as well as the objective means is shifted.

A condenser means comprising a condenser lens mount 75 containing a condenser lens 76 is mounted on partition 12 before hole 73 as by pivotal support 77. An objective means comprising an objective lens mount 78 containing a lens barrel 86 and objective lens 79 is mounted on the front plate 13 by means of a pivotal support 80, front plate 13 being sufficiently apertured to allow the necessary pivotal movement of the objective means. A mirror 81 is located at the apex of the optical axes of the condenser means and objective means. The mirror 81 may be mounted in known manner on a cover plate (not shown) for the guideway 16.

A mechanical means movably interconnects the condenser means and objective means to cause simultaneous movement thereof. Said interconnecting mechanical means may be constructed as a lever means comprising a lever arm 82 integral with condenser lens mount 75 and extending beyond front plate 13 to slidably engage a forked lever arm 83 which is integral with objective lens mount 78.

Either form of optical system disclosed in my co-pending application for a Photographic optical system, Serial No. 509,993, filed January 20, 1931, may be used although only the adaptation of one form is here shown.

An interconnecting means between the shiftable optical system and the movable reel supporting means may comprise a link 84 hingedly connected between the condenser lens mount 75 and an ear 85 on support arm 44.

During the initial run of the film, one leg of the angular optical axis of the shiftable optical system passes through the center of the images or exposure areas in one row on the film and through the center of displaced aperture 30' in presser pad 29. Upon movement of the reel supporting means to forward position at the end of said initial run, the switch 64 is moved to reverse running position and the film advancing mechanism is reversed as previously described and the shiftable optical system is moved by the interconnecting means between said reel supporting means and said shiftable optical system so that one leg of the angular optical axis thereof now passes through the center of the images or exposure areas in the other row on the film and through the center of the other displaced aperture 30 in presser pad 29 which has been moved into the upper position by frictional engagement with the film. Thus the operation of the motion picture apparatus is fully automatic during the entire run of the film through the apparatus.

Many variations of the motion picture apparatus of the present invention are possible, hence the present disclosure is to be construed in an illustrative and not in a limiting sense. The scope of the invention being defined by the following claims.

Having now particularly described my invention, what I desire to secure by Letters Patent of the United States and what I claim is:

1. In a motion picture apparatus, the combination with a film advancing mechanism for moving a film, a prime mover actuating said film advancing mechanism and a reversing means adapted to reverse the rotational direction of said prime mover, of a film reel for a film with one end attached to said reel, and a reel supporting means movably mounted and adapted to be moved by the pull of the film when all the film has been unwound from said reel and to operate said reversing means.

2. In a motion picture apparatus, the combination with a film advancing mechanism for moving a film, an electric motor for driving said film advancing mechanism and a reversing switch adapted to reverse the rotational direction of said motor, of a film reel for a film with one end attached to said reel, and a reel supporting means movably mounted and adapted to be moved by the pull of the film when all the film has been unwound from said reel and to operate said reversing switch.

3. In a motion picture apparatus adapted to receive a film reel and film with one end attached thereto, the combination with a film advancing mechanism adapted to engage said film, a prime mover actuating said film advancing mechanism, a spindle adapted to support said film reel and a clutch member on said spindle and driven by said prime mover but operative to turn said spindle in only one rotational direction, of a movable supporting means supporting said spindle and adapted to be moved by the increased tension which is created in the rear end of said film by said film advancing mechanism at the end of the initial run and a reversing means for said prime mover operated by said supporting means and causing rotation of said clutch in operative direction.

4. In a motion picture apparatus adapted to receive a film reel and film with one end attached thereto, the combination with a film advancing mechanism adapted to engage said film, a prime mover actuating the film advancing mechanism, and a pair of clutch members actuated by said prime mover and operative in single and opposite rotational directions and adapted to wind film on respective film reels, of a movable supporting means for one of the clutch members and adapted to support the film reel to which the film end is attached and adapted to be moved by the pull of the film when all of the film has been unwound from the supported reel, and a reversing means for said prime mover operated by said reel supporting means whereby during the initial run of film said film reels function as supply and take-up reels, and upon automatic reversal of said prime mover function as take-up and supply reels respectively.

5. In a motion picture apparatus adapted to receive a film, the combination with a reel supporting means movably mounted and adapted to support a film reel, and an optical system including a pivotally mounted objective, of an interconnecting means between said optical system and said reel supporting means and adapted upon movement of the said reel supporting means to rotate the objective of said optical system.

6. In a motion picture apparatus adapted to receive a film reel and film attached thereto, the combination with a reel supporting means pivotally mounted and adapted to support said film reel, film advancing mechanism adapted to engage said film and to create sufficient tension in the rear end of the film after the initial run to move said reel supporting means and an optical system including a pivotally mounted objective and a pivotally mounted condenser, of an interconnecting means between said optical system and said reel supporting means, and adapted automatically to rotate the objective and condenser of said optical system at the end of said initial run.

7. In a motion picture apparatus adapted to receive a film reel and film attached thereto, the combination with a reel supporting means pivotally mounted and adapted to support said film reel, film advancing mechanism adapted to engage said film and to create sufficient tension in the rear end of the film after the initial run to move said reel supporting means, a prime mover for said film advancing mechanism and an optical system including a pivotally mounted objective and a pivotally mounted condenser, of a reversing means for said prime mover operated by movement of said reel supporting means and an interconnecting means between said optical system and said reel supporting means, and adapted at the end of the initial run of film to swing the objective and condenser of said optical system.

8. A motion picture apparatus comprising a central partition, a support arm pivotally mounted on said partition and adapted to support a film reel, a pair of stops on said partition abutting said support arm in rearward and forward positions thereof, respectively, and a guard on said partition adapted to be adjacent said film reel in forward position of said support arm and to prevent removal of said film reel during forward position of said support arm.

9. In a motion picture apparatus adapted to receive a film having two laterally adjacent rows of images or exposure areas, the combination with a support arm pivotally mounted and adapted to support a film reel, a film advancing mechanism adapted to engage the film, a guideway provided with an aperture, a prime mover for said film advancing mechanism, and a reversing means for said prime mover operated by said support arm, of a presser pad provided with displaced apertures and adapted to move in frictional engagement with said film whereby the presser pad is moved by the film in a direction corresponding to the film movement.

10. In a motion picture apparatus adapted to receive a film having two laterally adjacent rows of images or exposure areas, the combination with a support arm pivotally mounted and adapted to support a film reel, a film advancing mechanism adapted to engage the film, a guideway provided with an aperture, a prime mover for said film advancing mechanism and a reversing means for said prime mover operated by said support arm, of a presser pad provided with displaced apertures and adapted to move in frictional engagement with said film and stop means limiting the movement of said presser pad, whereby the presser pad assumes a position corresponding to the direction of the film movement.

11. In a motion picture apparatus adapted to receive a film having two laterally adjacent rows of images or exposure areas, the combination with a support arm pivotally mounted and adapted to support a film reel, a film advancing mechanism adapted to engage the film, a guideway provided with an aperture, a prime mover for said film advancing mechanism, a reversing means for said prime moved operated by said support arm, a shiftable optical system, and an interconnecting means between said support arm and said optical system, of a presser pad adjacent said guideway, provided with displaced apertures and adapted to move in frictional engagement with said film, and stop means limiting the movement of said presser pad whereby the presser pad assumes a position corresponding to the direction of film movement and position of said optical system.

12. In a motion picture apparatus adapted to receive a film having laterally adjacent rows of images or exposure areas, the combination with a shiftable optical system comprising objective means and condenser means movable in planes perpendicular to each other, and lever means interconnecting said objective and condenser means for simultaneous movement thereof, of a pivotally mounted support arm movable to rearward and forward positions and interconnecting means between said support arm and said condenser means whereby the optical system is moved to a position corresponding to the rear or forward positions, respectively of said support arm.

13. In a motion picture apparatus adapted to receive a film having laterally adjacent rows of images or exposure areas, the combination with a shiftable optical system having an angular optical axis comprising objective means pivotally mounted to move in a plane perpendicular to one leg of said optical axis, condenser means pivotally mounted to move in a plane normal to the other leg of said optical axis, and a lever means interconnecting said objective means and said condsenser means for simultaneous movement thereof, of a pivotally mounted support arm movable to rearward and forward positions and a link between said support arm and said condenser means whereby the optical axis of said optical system is moved to positions corresponding to the rearward and forward positions, respectively, of said support arm.

14. In a motion picture apparatus adapted to receive a film having two laterally adjacent rows of images or exposure areas, the combination with an optical system comprising a condenser means movable in a plane perpendicular to the axis thereof, of a reel supporting means movable to rearward and forward positions and interconnecting means between said supporting means and said condenser means whereby the condenser means is moved to positions corresponding to the rearward and forward positions, respectively, of said supporting means.

15. In a motion picture apparatus adapted to receive a film having two laterally adjacent rows of images or exposure areas, the combination with an optical system comprising a condenser means pivotally mounted to move in a plane perpendicular to the axis thereof, of a support arm pivotally mounted for movement to rearward and forward positions and a link between said support arm and said condenser means whereby the condenser means is swung to positions corresponding to the rearward and forward positions, respectively, of said support arm.

OTTO WITTEL.